3,294,558
COLORLESS HIGH INDEX GLASS COMPOSITIONS
Charles E. Searight, Ezra M. Alexander, and John R. Ryan, Jackson, Miss., and Dominick Labino, Grand Rapids, Ohio, assignors to Cataphote Corporation, Toledo, Ohio, a corporation of Ohio
Filed Apr. 22, 1963, Ser. No. 274,523
10 Claims. (Cl. 106—54)

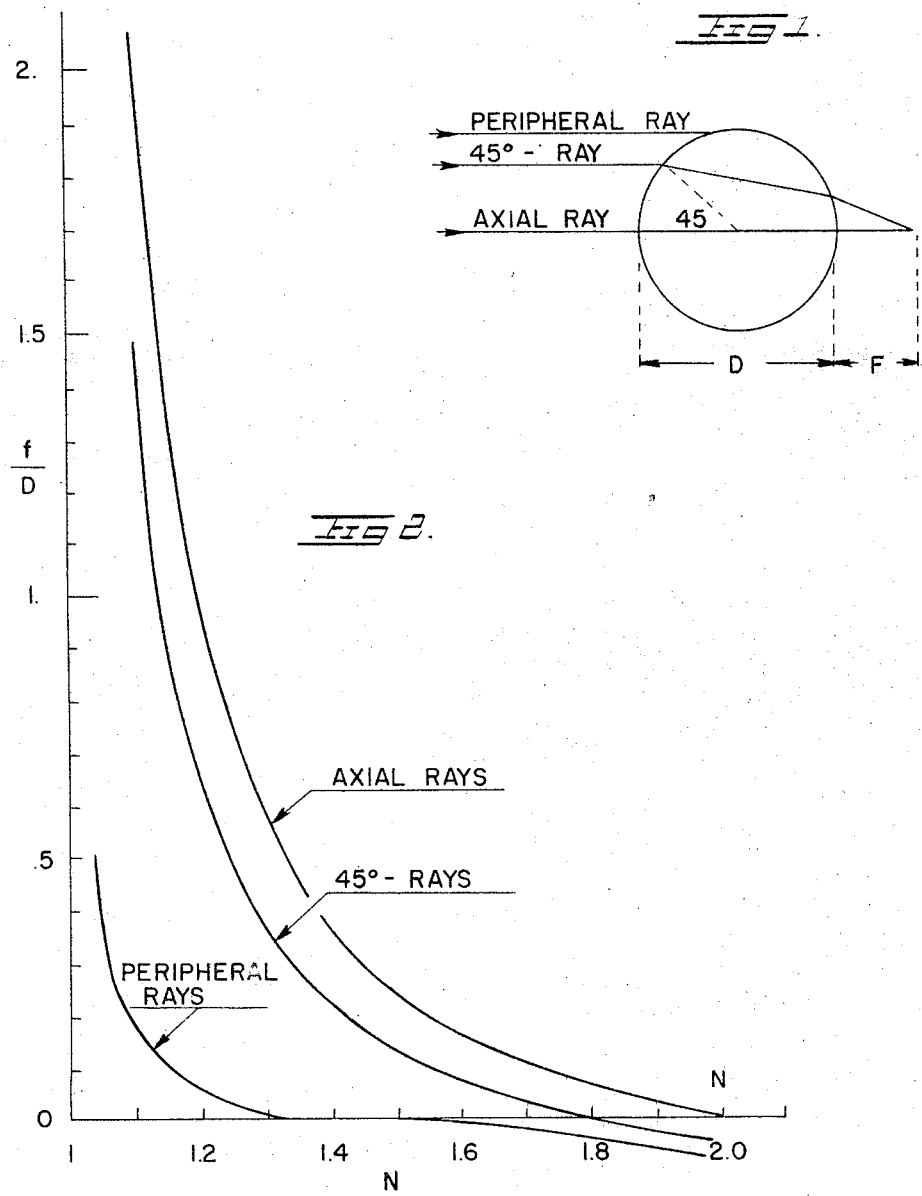

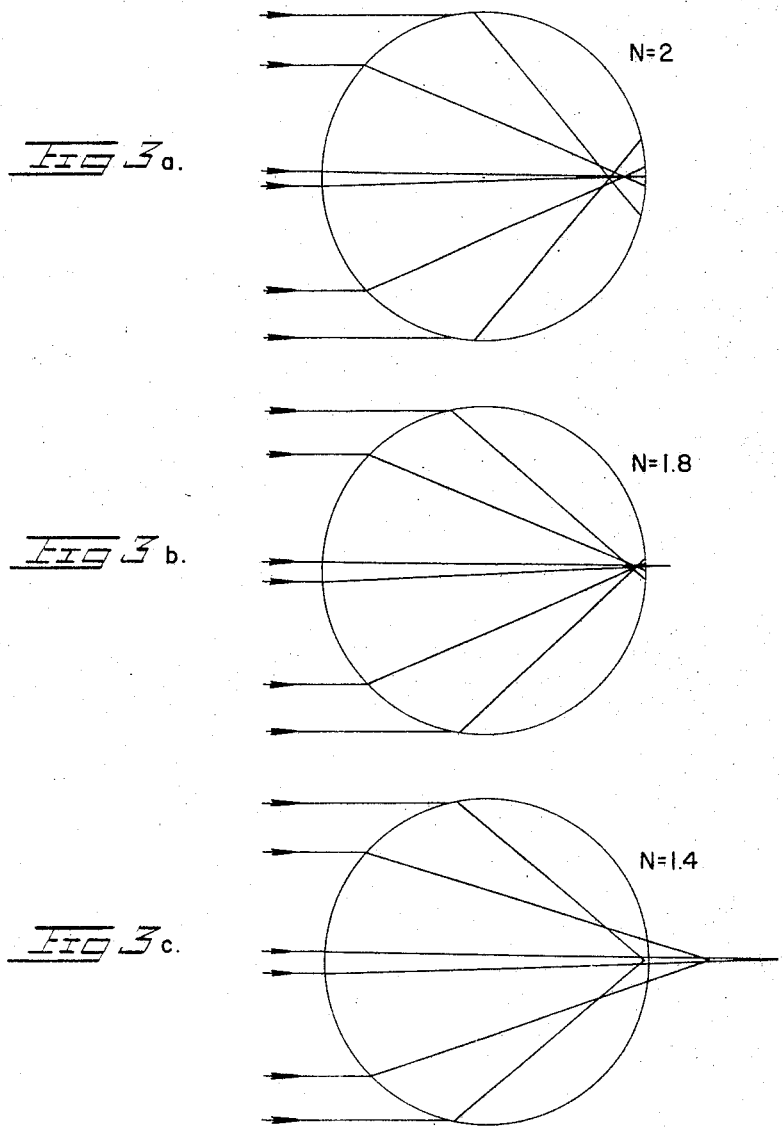

This invention relates to novel glass compositions particularly useful for the manufacture of glass beads but which are also suitable for the manufacture of various other materials such as flakes and the like.

Glass beads of this invention find particular utility as retroreflective lens elements which are used in highway marking paints, roadside signs, reflective sheeting, and in general are very useful in connection with any surface that requires illumination by reflection of light rays. Reflective brilliance of incident light rays is desired of retro-reflective lens elements.

Retro-reflective lens elements serve the useful purpose of focusing the light coming from a distant source to a point close to the back surface of the sphere; a reflector such as paint, tinfoil, and the like, should return the focused light through the beads in a direction essentially parallel to that of the incoming light. A retro-reflective system of this type will operate efficiently if the light is focused at, or close to, the back surface of the spherical beads, and the medium behind the beads has a high reflecting power for the focused light. It is well known that the first condition requires that the beads are made of glass having a high index of refraction.

The principles of the invention will be more particularly described with reference to the accompanying drawings in which:

FIG. 1 is a diagrammatical representation of the geometrical optics of the spherical lens;

FIG. 2 is a graph of the relative focal distance $f/D$ of a spherical lens as a function of the effective refractive index N; and FIGS. 3a, 3b and 3c are diagrams showing the computed trajectories of the axial, 45°, and peripheral rays through spheres of effective indices of refraction $N=2$, 1.8, and 1.4, respectively.

The geometrical optics of a spherical lens gives the following formula for the focal distance of the axial rays (FIG. 1);

$$f = r\frac{(2-N)}{(2N-2)} \quad (1)$$

wherein $f$ denotes the distance of the focus from the back surface of the sphere, $r$ the radius of the sphere, and $N=n/n_o$, the effective refractive index. The effective index N is the ratio of the index of the material of which the beads are made to that of the surrounding medium.

For rays passing farther away from the axis, the focal distance is shorter than that given by Formula 1. Therefore, there is no single figure that can be given as a focal distance of a sphere. Yet, for practical purposes, we want to know at what value of the effective index N the major part of the light flux is focused near to the back surface of the sphere. The calculation of the focal distances for three paraxial rays was made for a series of refractive indices between 1 and 2. The results are plotted in FIG. 1. The "relative focal distance" is the focal distance measured from the back surface of the sphere, expressed in terms of the diameter D of the sphere. It is apparent that it takes an effective refractive index of 2.0 to focus the axial rays at the back surface ($f/D=0$), while it is enough to have $N=1.8$ to reach the same condition in the 45° rays and only $N=1.4$ with the peripheral rays. The three cases are shown explicitly in FIG. 2. With $N=2$, all of the rays, with the exception of the narrow pencil of the axial rays, are focused inside of the sphere, and the concentrated light flux is spread over a small circular area over a back surface. With $N=1.4$, the situation is reversed; all of the rays are focused behind the sphere, with the exception of the peripheral rays. The net result, however, is roughly the same as in the first case, the strongly illuminated area being about the same size at the back surface of the sphere. The intermediate case with $N=1.8$ appears to give better focusing than either of the two extremes. Actually, a closer examination shows that it is more important to have a close focal distance for the light flux between the axial and 45° rays than for the peripheral flux, because of the great loss by reflection at high angles of incidence. Consequently, an effective index between 1.8 and 2.0 is the optimum value.

If the glass beads are used in such a way that they are in contact with the light reflecting layer at their back surface only, their front surface is exposed to the air ($n_o=1$). The refraction at the front surface is determined only by the axial refractive index $n$ of the glass. As long as all rays are focused internally or at the back surface, the refractive index of the medium behind the beads need not be considered. It was this consideration which led to the specification of $n=1.9$ for the desired glass composition.

There are many commercial glass compositions having the refractive index range sought for optimum brilliance, et cetera, and which are useful for the manufacture of glass beads. Heretofore, various compositions of glass have contained lead oxide, which was very desirable for many reasons, but the glass beads produced from these glasses were generally light yellow in color, and these beads would discolor further when exposed to atmospheres containing sulfide fumes due to the formation of lead sulfide. Also, the smelting of lead oxide is harmful to furnace personnel in that the fumes are hazardous.

More recently, high index, essentially colorless, lead-free glass systems have been utilized in overcoming many of the difficulties of the lead oxide containing glasses. However, these more recent lead-free glasses have been characterized by high densities, high specific heats, high cost, and relatively low surface tensions when compared to the glass compositions of the present invention. Additionally, glasses of the prior art have a tendency to become cloudy or opaque, which is known as devitrification.

Glass beads made from glass compositions of the present invention overcome many of the objectionable features of the prior art compositions. These are overcome by glass compositions which are characterized by having substantially higher surface tension and at the same time are less dense. These and other results were achieved due to the unexpected result of the addition of lime to these high barium and titanium glasses. Heretofore, it was believed that lime or calcium oxide would devitrify the glass and no substantial quantity of it could be incorporated in these high barium and titania glasses and still obtain vitreous glass beads. The calcium oxide actually lowers the melting temperature of the glass compositions, and this also is highly unexpected and not predictable since calcium oxide has a melting temperature of nearly 2600° C. but yet lowers the relatively low melting temperature of the barium oxide and titanium dioxide system significantly. Further, lime is by far the cheapest RO type material and its use in these glass compositions significantly lowers the cost of these glasses. For instance, lime is less than one cent per pound raw material cost whereas barium costs about seven cents per pound and zinc oxide costs about fourteen to sixteen cents per pound. Except for the fact that the lime forms a heretofore unknown eutectic in the glass compositions and does not devitrify in large quantity, it would not have been possible to overcome the objections to the prior art compositions. Additionally, calcium oxide has a high index of refraction and assists the glass in achieving a higher index of refraction.

Basically, the glass compositions of the invention can be described as titanium dioxide-silicon dioxide-barium oxide calcium oxide glass systems. Silicon dioxide is perhaps the strongest, best known and most wdely accepted glass former of all the oxides. At least two-tenths of one percent of silicon dioxide is present in the glass compositions of the invention since it greatly assists the titanium dioxide in the glass formation. Titanium dioxide is not as well known or as widely accepted a glass forming oxide; and it has been found to be more difficult to form glasses with titanium dioxide in the absence of silicon dioxide, boric oxide, germanium oxide or antimony oxide. Therefore, it is also advantageous to have present in the glass compositions at least 0.2% by weight of boric oxide and sodium oxide. Likewise, due to the fact that calcium oxide significantly lowers the melting and fining temperature of these glass compositions, it is preferably present in at least six or seven percent by weight.

The glass compositions of the invention consist essentially of from about 10% to about 50% by weight of titanium dioxide, from about 10% to about 65% by weight of RO type oxides selected from the group consisting of barium oxide and zinc oxide, at least 10% by weight being barium oxide, from about 6% to about 40% by weight of calcium oxide, and from about 0.2% to about 30% by weight of silicon dioxide. The compositions may also contain up to 14% by weight of boric oxide, up to 16% by weight of alkali metal oxides, up to 16% by weight of zinc oxide and up to 6% by weight of alumina.

The ranges given above define the glass compositions of the invention with indices of refraction from about 1.6 to about 2.0.

Table I contains various representative examples of glass compositions, in parts by weight, which fall within the scope of the invention.

The composition in mol percent of Prior Art Example 1 is as follows:

| | Percent |
|---|---|
| Titanium dioxide | 42.0 |
| Barium oxide | 35.1 |
| Boric oxide | 10.4 |
| Zinc oxide | 12.4 |

The composition in mol percent of Prior Art Example 2 is as follows:

| | Percent |
|---|---|
| Titanium dioxide | 43.7 |
| Barium oxide | 38.6 |
| Boric oxide | 17.7 |
| Other minor ingredients and contaminants | 4.3 |

The glass compositions of the invention may be prepared by melting a mix of the batch components in a conventional glass furnace made of conventional heat resistant refractories free from deleterious contaminating material, particularly iron. The batch is composed of oxides or compounds decomposable to oxides under the conditions of melting in the proper proportion to yield the specified compositions. In general, titanium, aluminum and zinc are added as oxides; barium is added in whole or in part as the peroxide, the remainder as oxide or carbonate; calcium and sodium may be added as carbonates; silica may be added as high grade quartz sand; and boron may be added as boric acid.

The glass compositions of the invention melt at temperatures within the range of 1100–1400° C. The batch mix is preferably added to the furnace continuously, or in succession increments allowing each increment to melt before the increment is added, until the glass melt is brought to the desired level which may require from 4 to 10 hours.

After the melt has been prepared, it can be converted to glass beads by conventional methods, either directly from the melt or by pouring a stream of the molten glass into water to form cullet, particles of which are blown

*Table I*

| | $TiO$ | $BaO$ | $CaO$ | $Na2O$ | $SiO$ | $B_3O_2$ | $Al_2O_3$ | $ZnO$ | Refractive Index | Density |
|---|---|---|---|---|---|---|---|---|---|---|
| 1 | 20 | 20 | 7 | 8 | 25 | 9.5 | | 10.5 | 1.68 | 3.? |
| 2 | 10 | 40 | 7 | 8 | 15 | 9.5 | | 10.5 | 1.68 | 3.7 |
| 3 | 20 | 15 | 30 | 4 | 30 | 0.5 | 0.5 | | 1.77 | 3.5 |
| 4 | 15 | 10 | 40 | 4 | 30 | 0.5 | 0.5 | | 1.76 | 3.4 |
| 5 | 20 | 35 | 20 | 4 | 20 | 0.5 | 0.5 | | 1.81 | 4.0 |
| 6 | 10 | 50 | 7 | 5 | 20 | 8 | | | 1.69 | 3.7 |
| 7 | 20 | 20 | 7 | 12 | 30 | 9.5 | | 1.5 | 1.66 | 3.1 |
| 8 | 25 | 25 | 30 | 4 | 15 | 0.5 | 0.5 | | 1.84 | 3.8 |
| 9 | 25 | 35 | 20 | 2 | 16 | 2 | | | 1.83 | 3.8 |
| 10 | 25 | 35 | 20 | 0.5 | 17 | 1.5 | 2 | | 1.83 | 3.9 |
| 11 | 25 | 15 | 40 | 14 | 5 | 0.5 | 0.5 | | 1.81 | 3.4 |
| 12 | 25 | 35 | 10 | 0.5 | 14 | 5.5 | | 10 | 1.79 | 3.6 |
| 13 | 15 | 43 | 7 | 2 | 14 | 14 | 2 | 3 | 1.67 | 3.2 |
| 14 | 22.2 | 38.9 | 11.1 | 4.4 | 22.2 | 0.6 | 0.6 | | 1.81 | 4.0 |
| 15 | 36 | 40 | 7 | 1 | 12 | 1 | | 3 | 1.89 | 3.9 |
| 16 | 20 | 30 | 19 | 2 | 20 | 2 | 6 | 1 | 1.77 | 3.7 |
| 27 | 35 | 46 | 6 | 1 | 11 | 1 | | | 1.92 | 4.1 |
| 18 | 37 | 28.5 | 7 | 1.5 | 11 | | | 15 | 1.90 | 4.2 |
| 19 | 39 | 28 | 6 | 1 | 9 | 1 | | 16 | 1.90 | 4.1 |
| 10 | 48 | 35 | 7 | | 5 | 1 | | 4 | 1.95 | 4.1 |
| 11 | 35 | 46 | 7 | 1 | 10 | 1 | | | 1.95 | 4.1 |
| 22 | 45 | 37.8 | 7 | 0.2 | 5 | 1 | | 4 | 1.96 | 4.0 |

Table II is a comparison of two typical prior art examples and examples of the invention with respect to the more important glass bead making properties of surface tension and specific heat.

*Table II*

| | Surface Tension (Dynes/cm. at 900° C.) | Specific Heat (Cal./gm./° C.) |
|---|---|---|
| Prior Art Example 1 | 291.0 | 0.161 |
| Prior Art Example 2 | 314.0 | 0.141 |
| Example 16 of Table I | 377.0 | 0.120 |
| Example 18 of Table I | 355.0 | 0.116 | or dropped through a high temperature flame or a radiant heating zone to soften them sufficiently to form spheres by the action of surface tension followed by rapid cooling to harden the spheres without devitrification.

We claim:

1. A high refractive index glass composition consisting essentially of from about 10% to about 50% by weight of titanium dioxide, from about 10% to about 65% by weight of RO type oxides selected from the group consisting of barium oxide and zinc oxide, at least 10% by weight being barium oxide, from about 6% to about 40% by weight of calcium oxide, and from about 0.2% to about 30% by weight of silicon dioxide.

2. A high refractive glass composition as defined in claim 1 containing up to 14% by weight of boric oxide.

3. A high refractive glass composition as defined in claim 1 containing up to 16% by weight of sodium oxide.

4. A high refractive glass composition as defined in claim 1 containing up to 16% by weight of zinc oxide.

5. A high refractive glass composition as defined in claim 1 containing up to 6% by weight of alumina.

6. A high refractive index glass composition consisting essentially by weight:

| | Percent |
|---|---|
| $TiO_2$ | 20 |
| BaO | 20 |
| CaO | 7 |
| $Na_2O$ | 8 |
| $SiO_2$ | 25 |
| $B_2O_3$ | 9.5 |
| ZnO | 10.5 |

7. A high refractive index glass composition consisting essentially by weight:

| | Percent |
|---|---|
| $TiO_2$ | 15 |
| BaO | 10 |
| CaO | 40 |
| $Na_2O$ | 4 |
| $SiO_2$ | 30 |
| $B_2O_3$ | 0.5 |
| $Al_2O_3$ | 0.5 |

8. A high refractive index glass composition consisting essentially by weight:

| | Percent |
|---|---|
| $TiO_2$ | 25 |
| BaO | 25 |
| CaO | 30 |
| $Na_2O$ | 4 |
| $SiO_2$ | 15 |
| $B_2O_3$ | 0.5 |
| $Al_2O_3$ | 0.5 |

9. A high refractive index glass composition consisting essentially by weight:

| | Percent |
|---|---|
| $TiO_2$ | 35 |
| BaO | 46 |
| CaO | 7 |
| $Na_2O$ | 1 |
| $SiO_2$ | 10 |
| $B_2O_3$ | 1 |

10. A high refractive index glass composition consisting essentially by weight:

| | Percent |
|---|---|
| $TiO_2$ | 45 |
| BaO | 37.8 |
| CaO | 7 |
| $Na_2O$ | 0.2 |
| $SiO_2$ | 5 |
| $B_2O_3$ | 1 |
| ZnO | 4 |

References Cited by the Examiner

UNITED STATES PATENTS 2,939,797  6/1960  Rindone _____ 106—47
3,193,401  7/1965  Alexander et al. _____ 106—54

FOREIGN PATENTS 719,067  11/1931  France.

HELEN M. McCARTHY, *Primary Examiner.*